United States Patent
Chia et al.

(10) Patent No.: US 7,434,019 B2
(45) Date of Patent: Oct. 7, 2008

(54) METHOD AND APPARATUS FOR MANAGING BUFFER RANDOM ACCESS MEMORY

(75) Inventors: KokHoe Chia, Singapore (SG); Myint Ngwe, Singapore (SG); JinQuan Shen, Singapore (SG); SweeKieong Choo, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 747 days.

(21) Appl. No.: 10/664,611

(22) Filed: Sep. 18, 2003

(65) Prior Publication Data

US 2005/0066227 A1    Mar. 24, 2005

(51) Int. Cl.
*G06F 12/00* (2006.01)
(52) U.S. Cl. .................................................... 711/170
(58) Field of Classification Search ........................ None
See application file for complete search history.

(56) References Cited

U.S. PATENT DOCUMENTS

| | | | |
|---|---|---|---|
| 5,948,062 A * | 9/1999 | Tzelnic et al. ............... 709/219 |
| 5,995,308 A | 11/1999 | Assouad | |
| 6,009,498 A | 12/1999 | Kumasawa | |
| 6,098,185 A | 8/2000 | Wilson | |
| 6,101,574 A | 8/2000 | Kumasawa | |
| 6,336,202 B1 * | 1/2002 | Tsuchimoto et al. ......... 714/768 |
| 6,393,492 B1 | 5/2002 | Cornaby | |
| 6,442,715 B1 | 8/2002 | Wilson | |
| 2002/0108072 A1 * | 8/2002 | Beng Sim et al. ............... 714/5 |

* cited by examiner

*Primary Examiner*—Hyung Sough
*Assistant Examiner*—Craig E Walter
(74) *Attorney, Agent, or Firm*—John D. Veldhuis-Kroeze; Westman, Champlin & Kelly, P.A.

(57) ABSTRACT

A buffer random access memory has a first portion reserved for a defect table and a second portion reserved for data caching. A method of managing the buffer random access memory includes determining actual memory space of the first portion which is occupied by the defect table. This identifies unused memory space of the first portion of the buffer random access memory. The method then includes reallocating the unused memory space of the first portion of the buffer random access memory for use in data caching. Controllers and mass storage devices which implement the method are also provided.

12 Claims, 6 Drawing Sheets

METHOD AND APPARATUS FOR MANAGING BUFFER RANDOM ACCESS MEMORY

FIELD OF THE INVENTION

The present invention relates generally to management of media defect information in mass storage devices. More particularly, the present invention relates to a method of managing a buffer random access memory (RAM) used for storage of a defect table and for data caching.

BACKGROUND OF THE INVENTION

In conventional mass storage devices, such as disc drive data storage systems, media defect information is recorded in a defect table that is stored on the recording medium. In a disc drive, the defect table is typically stored in the reserved tracks of the recording medium. Conventionally the defect table has been of a fixed, predetermined sized, length and/or capacity.

The defect table indicates unreliable portions of the recording medium. During production of the mass storage device, the device is tested to determine which portions, if any, of the recording medium are not sufficiently reliable for writing and reading of a data. The address of each of the unreliable portions is stored on the recording medium in the defect table. When the mass storage device is running, the defect table is loaded into buffer random access memory (RAM), provided by a volatile memory device, that is also shared with interface transfer functions for the purpose of data caching.

Typically, larger defect tables for a mass storage device require more buffer (RAM) space. For a given quantity of RAM, this results in less buffer space being available for data caching. A typical disc drive type mass storage device with 80 gigabytes (GB) capacity would require not less than 64 kilobyte (KB) of buffer RAM to be reserved for defect table purposes. The size of the defect table is usually fixed across all disc drives of a particular type with different numbers of headers. A larger defect table size is usually required to insure that defects can be recorded, while at the same time meeting production yield requirements for the particular type of drive. Generally, production yield requirements include having a minimum number of storage devices fail due to insufficient defect table size.

For disc drive type mass storage device with more than 80 GB capacity, such as the 240 GB capacity drives, buffer RAM size the defect table may be as much as three times the buffer RAM size required for drives having less than 80 GB capacity. Thus, these drives may require that as much as 192 KB of buffer RAM be reserved for the defect table. This provides a significant impact to the performance of low-cost drives that use smaller sized buffer RAM. A method of reducing the portion of the buffer RAM occupied by the defect table, without increasing the number of mass storage devices that fail certification testing due to insufficient defect table storage capacity, would therefore be a significant improvement, particularly for low-cost disc drive type mass storage devices.

Embodiments of the present invention provide solutions to these and/or other problems, and offer other advantages over the prior art.

SUMMARY OF THE INVENTION

A buffer random access memory has a first portion reserved for a defect table and a second portion reserved for data caching. A method of managing the buffer random access memory includes determining actual memory space of the first portion which is occupied by the defect table. This identifies unused memory space of the first portion of the buffer random access memory. The method then includes reallocating the unused memory space of the first portion of the buffer random access memory for use in data caching. Controllers and mass storage devices which implement the method are also provided.

In some embodiments, a mass storage device of the present invention includes a storage media storing a defect table and data cache parameters. A buffer random access memory having a first portion reserved for the defect table and a second portion reserved for data caching is also included. The defect table and the data cache parameters are uploaded into the buffer random access memory from the storage media. A controller, coupled to the storage media and to the buffer random access memory, is configured to determine actual memory space of the first portion of the buffer random access memory occupied by the defect table to identify unused memory space of the first portion. The controller then reallocates the unused memory space of the first portion of the buffer random access memory for use in data caching.

Other features and benefits that characterize embodiments of the present invention will be apparent upon reading the following detailed description and review of the associated drawings.

BRIEF DESCRIPTION OF THE DRAWINGS

FIGS. 3-1 and 3-2 are block diagrams illustrating buffer random access memory (RAM) provided by the volatile memory device and used to store a defect table and for data caching.

FIGS. 5-1 and 5-2 are block diagrams illustrating a buffer RAM and more particular steps in the method shown in FIG. 4.

DETAILED DESCRIPTION OF ILLUSTRATIVE EMBODIMENTS

The present invention provides methods and apparatus which can be used to reduce the portion of the buffer random access memory (RAM) occupied by the defect table in mass storage devices. Reducing the amount of the buffer RAM used by the defect table increases the amount of the buffer RAM which can be used for data caching. This positively impacts drive performance, particularly in low-cost disc drives or other types of mass storage devices that use smaller sized buffer RAM.

The invention includes methods of salvaging unused portions of the buffer RAM which are reserved for defect table storage. The unused buffer RAM space is then used for data caching by interface data transfer components or functions. The method can use a firmware approach which allows a larger defect table capacity to be provided in the mass storage device, without sacrificing the unused buffer space taken up by the defect table in certain drives. Making more of the buffer RAM available for data caching positively impacts drive performance, while at the same time, larger defect tables can still be accommodated when necessary. Thus, the present invention also helps achieve desired production yield goals related to a minimum number of mass storage devices failing due to a "defect table full" condition where the media defect information cannot be completely stored in the allocated defect table portion of the buffer RAM. Thus, the present invention is particularly useful for low-cost disc drive type mass storage devices where limited size buffer RAM is used. However, the present invention is not limited to this type of disc drive mass storage device. Instead, the present invention applies to mass storage device in general.

Figure 1:
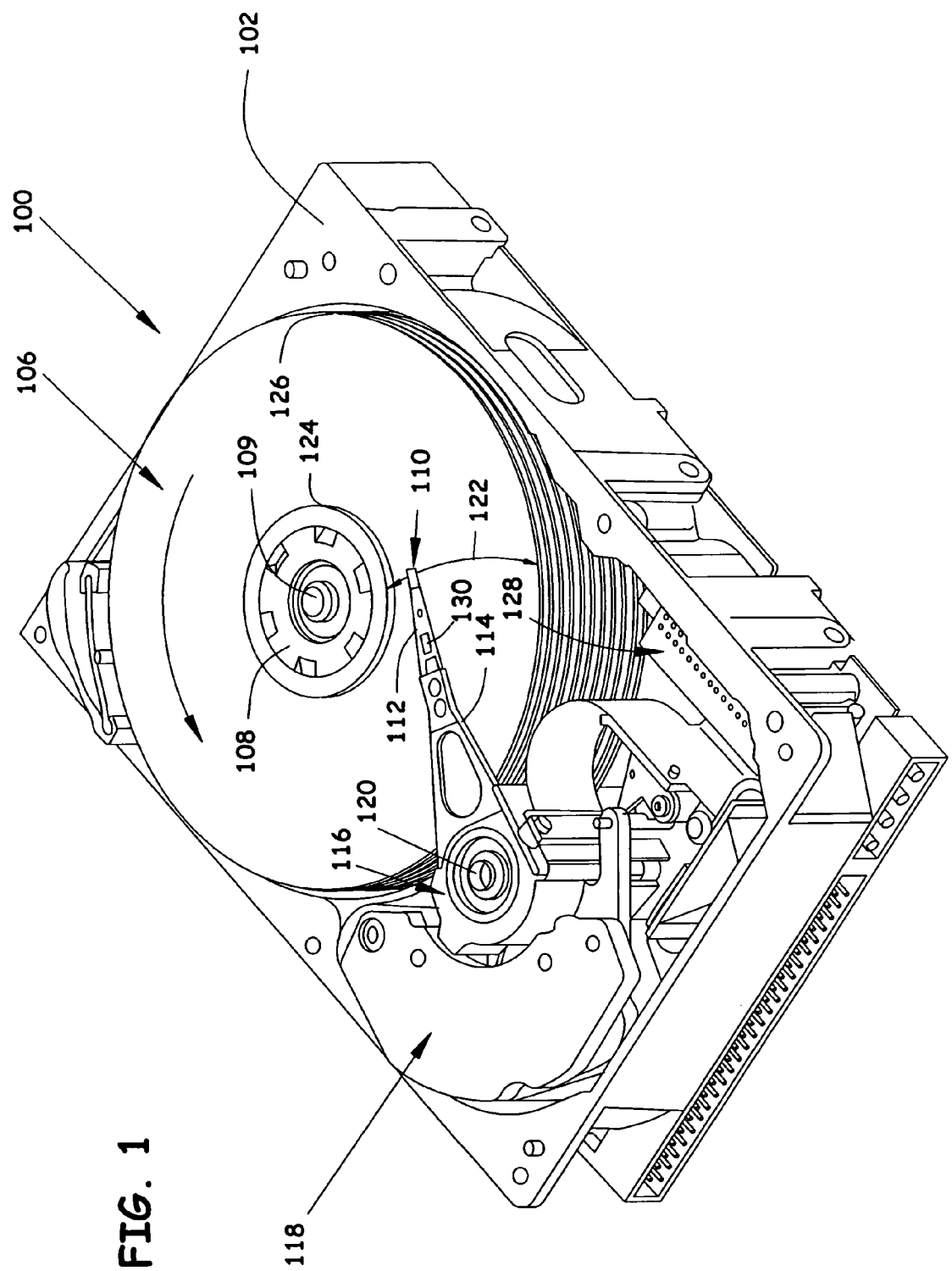
FIG. 1 is a perspective view of a disc drive type mass storage device.

Referring now to FIG. 1, a perspective view of a disc drive 100 in which the present invention is useful is shown. Disc drive 100 includes a housing with a base 102 and a top cover (not shown). Disc drive 100 further includes a disc pack 106 which is mounted on a spindle motor (not shown) by a disc clamp 108. Disc pack 106 includes a plurality of individual discs, which are mounted for co-rotation about central axis 109.

Each disc surface has an associated disc head slider 110 which is mounted to disc drive 100 for communication with the disc surface. Sliders 110 support MR heads (represented in FIG. 2) for reading data from the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a VCM, shown generally at 118. VCM 118 rotates actuator 116 with its attached head 110 about a pivot shaft 120 to position head 110 over a desired data track along an arcuate path 122 between a disc inner diameter 124 and a disc outer diameter 126. VCM 118 is driven by servo electronics (diagrammatically included within electronics 128) based on signals generated by heads 110 and a host computer (not shown). A micro-actuator 130, which provides fine position control of heads 110, is used in combination with VCM 118 that provides relatively coarse positioning of heads 110.

While disc drive 100 is shown in FIG. 1 for illustrative purposes, the present invention is not limited to use with disc drive data storage systems. Instead, the present invention applies to mass storage devices which utilize a buffer RAM for storage of a media defect table and for data caching.

Figure 2:
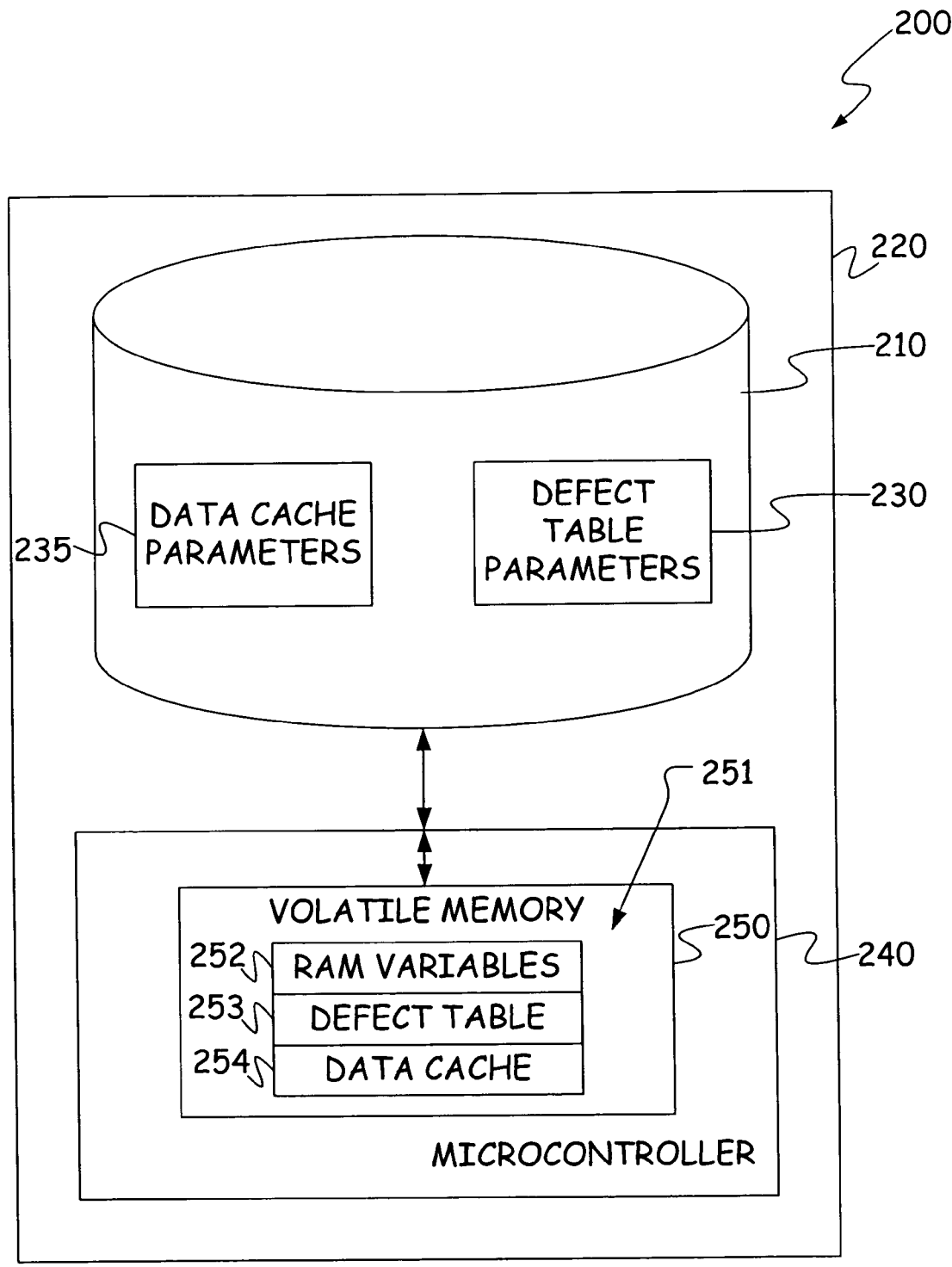
FIG. 2 is a block diagram illustrating a storage medium and a volatile memory device of a mass storage device.

FIG. 2 is a block diagram that provides a system level overview 200 of the operation of embodiments of the present invention. System 200 includes a recording medium 210 on a mass storage device 220, for example such as disc drive 100 shown in FIG. 1. The recording medium 210 includes a defect table 230 stored thereon. Also stored on recording medium 210 are data cache parameters 235.

The mass storage device 220 includes a microcontroller 240 which is operably coupled to the recording medium 210. The mass storage device 220 also includes a volatile memory device 250, which provides buffer RAM 251, operably coupled to the microcontroller 240. Within the buffer RAM 251, a first portion 252 is reserved for RAM variable storage, a second portion 253 is reserved for storage of a defect table, and a third portion 254 is reserved for data caching. Defect table portion 253 is used to store defect table parameters 230 uploaded from recording medium 210 during start-up of the storage device. Data caching portion 254 stores, among other things, data cache parameters 235 uploaded from the recording medium and used in data caching. The defect table portion 253, which is also known as a defect buffer, is used by microcontroller 240 to determine particular portions of the recording medium 210 which are associated with a defect that would prohibit use of the particular portions.

Figures 1, 2, 3:
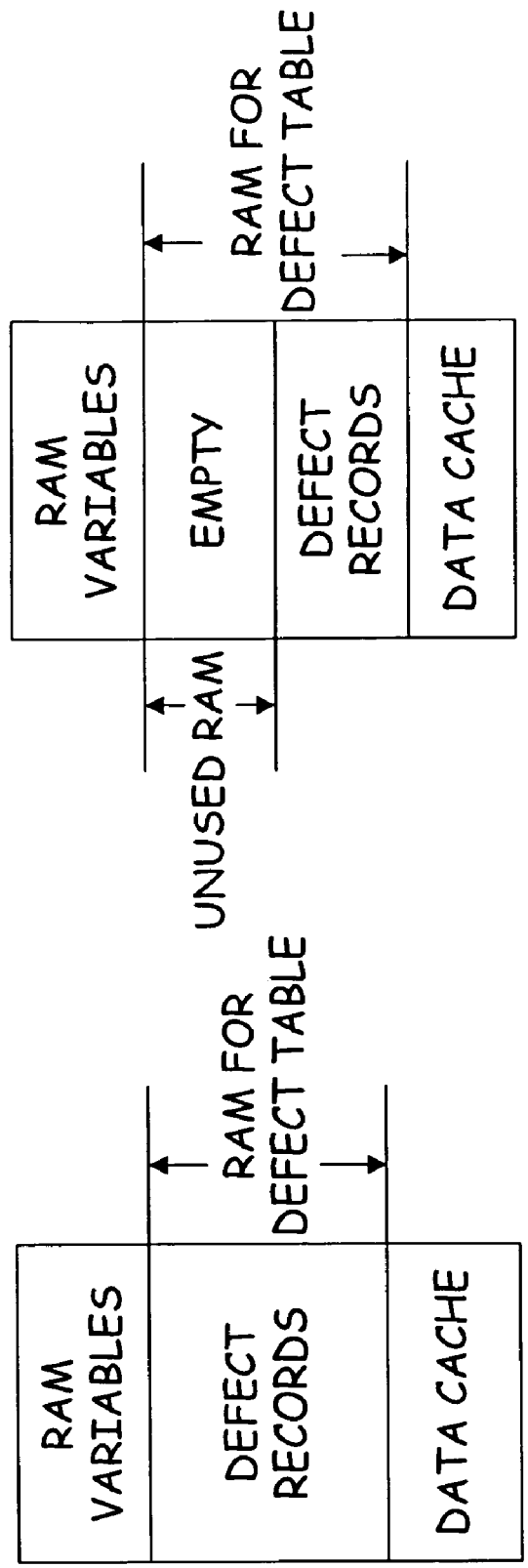

Using conventional methods, controller 240 or other firmware within the mass storage device allocates a fixed amount of the buffer RAM 251 for the defect table. In order to qualify a disc drive with a larger number of media defects as having passed drive certification testing, conventional methodology dictates that a large RAM size for the defect table is allocated. The amount of RAM allocated for the defect table has conventionally been fixed. For example, for disc drives with more than 80 GB capacity, a typical fixed RAM size is 192 KB. FIG. 3-1 illustrates a buffer RAM 251 for a mass storage device in which the number of media defects is large, and thus the defect records within the defect table portion 253 is full or almost full. Conventionally, this mass storage device could be qualified as passing certification testing.

Typically, a large number of disc drives or other mass storage devices actually have a much smaller number of media defects. FIG. 3-2 illustrates a buffer RAM 251 corresponding to a mass storage device having a relatively small number of defects. In this instance, only a portion 253-1 of the allocated defect table RAM space 253 is used to record media defect information (defect records). The remaining portion 253-2 of the RAM space 253 reserved for the defect table is empty and not in use. Often, unused RAM in defect tables constitutes are large portion of the total RAM allocated for the defect table.

Figure 4:
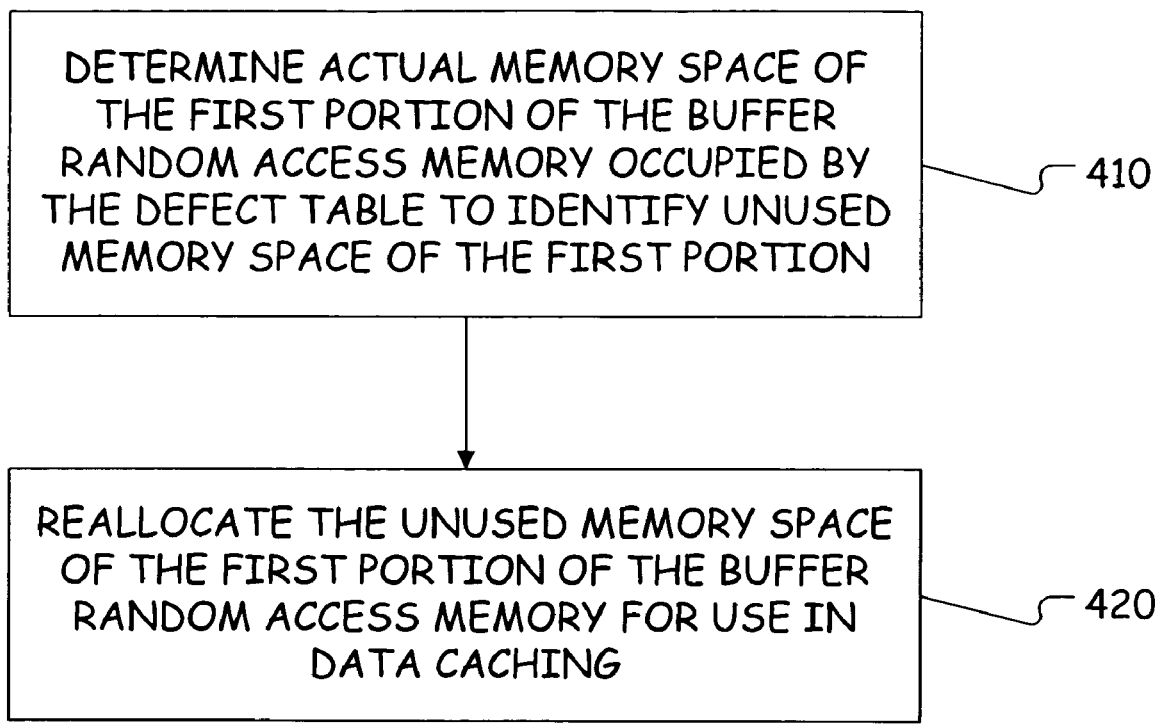
FIG. 4 is a flow diagram illustrating a method of the present invention.

The present invention includes a method of managing a buffer RAM 251 having a first portion 253 reserved for a defect table and a second portion 254 reserved for data caching. Controller 240 is configured to implement the method described below. FIG. 4 is a flow diagram illustrating an embodiment of that method. The method of the present invention allows unused buffer RAM to be used as additional data cache memory space. The method is used to dynamically allocate defect table memory locations and data cache memory locations after scanning the storage media for defects during the certification process.

As shown in block 410 in FIG. 4, the method includes determining actual memory space of the first portion of the buffer RAM occupied by the defect table to identify unused memory space. In other words, this step includes identifying actual memory space 253-1, of the total memory space 253 of the buffer RAM reserved for the defect table, which is to be occupied by the defect table. This identifies unused memory space 253-2 of the total first portion 253 reserved for the defect table.

In some embodiments, the step 410 of determining the actual memory space of the first portion of the buffer RAM occupied by the defect table to identify unused memory space further includes obtaining information on a total number of defects identified on the storage media. Then, the actual memory space, of the first portion of the buffer RAM occupied by the defect table, is calculated based upon the total number of defects identified on the storage media. After determining the actual memory space 253-1 of the buffer RAM occupied by the defect table, the unused memory space 253-2 of the first portion 253 of the buffer RAM is reallocated for use in data caching.

Figures 2, 5:
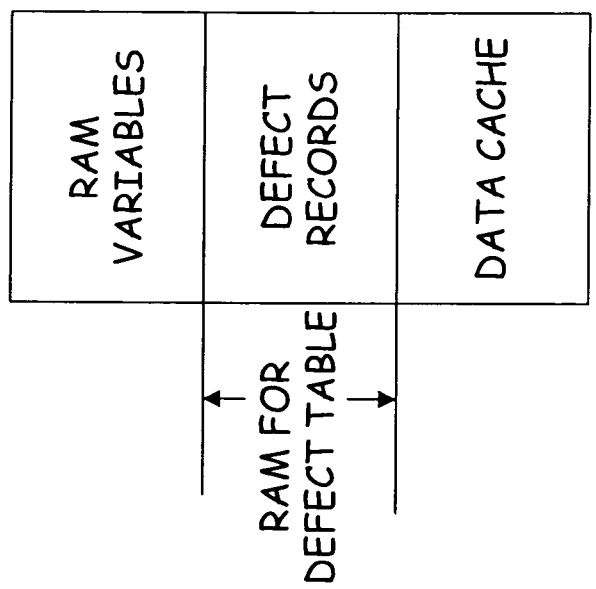
Figures 1, 5:
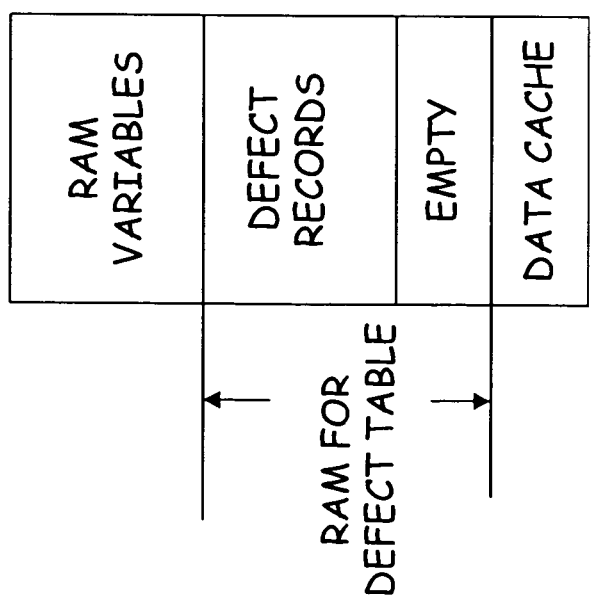
Figure 6:
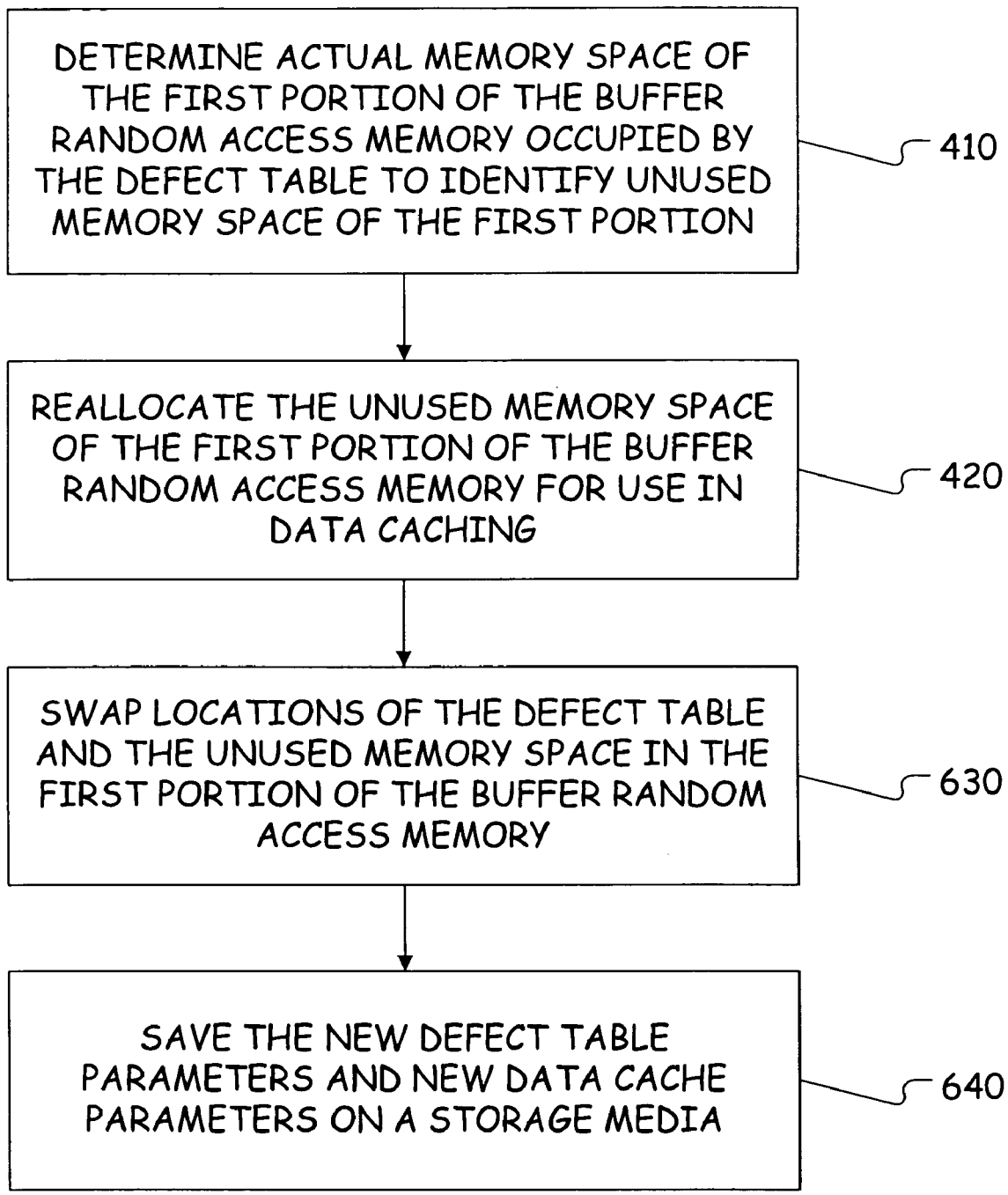
FIG. 6 is a flow diagram illustrating more specific steps in the method shown generally in FIG. 4.

FIGS. 5-1, 5-2 and 6 illustrate more specific embodiments of the method which aid in reallocating the buffer RAM. As shown in block 630 of the more specific flow diagram of FIG. 6, the method can also include swapping locations of the defect table 253-1 and the unused memory space 253-2 in the first portion 253 of the buffer random access memory. This places the unused memory space 253-2 closest to the second portion 254 of the buffer random access memory reserved for data caching, as is shown in FIG. 5-1. Prior to swapping locations of the defect table 253-1 and the unused memory space 253-2, variables defined in the defect table are typically coded as address dynamic changeable. Thus, swapping locations of the defect table and the unused memory space in the first portion of the buffer random access memory further includes, in some embodiments, dynamically changing addresses of the variables defined in the defect table to obtain new defect table parameters.

Then, as illustrated at block 640, the more specific method embodiments can include saving the new defect table parameters and new data cache parameters on the storage media. When the storage media is a data storage disc of a disc drive data storage system, the new defect table parameters and new data cache parameters can be saved in reserved cylinders of the storage disc. As illustrated in FIG. 5-2, this results in the portion 253 of the buffer RAM 251 reserved for storage of defect records (i.e., reserved for the defect table) being reduced to the actual space required to store those defect records. It also results in an increase in the portion 254 of the buffer RAM reserved for data cache. This in turn results in enhanced performance of the mass storage device.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the mass storage device or system while maintaining substantially the same functionality without departing from the scope and spirit of the present invention. In addition, although the preferred embodiment described herein is directed to a disc drive data storage system type of mass storage device, it will be appreciated by those skilled in the art that the teachings of the present invention can be applied to other mass storage devices, without departing from the scope and spirit of the present invention.

What is claimed is:

1. A method of managing a buffer random access memory, the buffer random access memory having a first portion allocated for a defect table and a second portion allocated for data caching, the method comprising:
   determining actual memory space of the first portion of the buffer random access memory occupied by the defect table to identify unused memory space of the first portion;
   reallocating the unused memory space of the first portion of the buffer random access memory for use in data caching; and
   swapping locations of the defect table and the unused memory space in the first portion of the buffer random access memory such that the unused memory space of the first portion of the buffer random access memory is closest to the second portion of the buffer random access memory reserved for data caching.

2. The method of claim 1, wherein determining the actual memory space of the first portion of the buffer random access memory further comprises:
   obtaining information on a total number of defects identified on a storage media; and
   calculating the actual memory space of the first portion of the buffer random access memory occupied by the defect table based upon the total number of defects identified on the storage media.

3. The method of claim 1, and prior to swapping locations of the defect table and the unused memory space in the first portion of the buffer, further comprising coding variables defined in the defect table as address dynamic changeable.

4. The method of claim 3, wherein swapping locations of the defect table and the unused memory space in the first portion of the buffer random access memory further comprising dynamically changing addresses of the variables defined in the defect table to obtain new defect table parameters.

5. The method of claim 4, and further comprising saving the new defect table parameters and data cache parameters on a storage media.

6. The method of claim 5, wherein the storage media is a data storage disc of a disc drive data storage system, and wherein saving the new defect table parameters and the data cache parameters on the storage media further comprises storing the new defect table parameters and the data cache parameters in reserved cylinders of the data storage disc.

7. A controller configured to implement the method of claim 1.

8. A mass storage device comprising:
   a storage media storing a defect table and data cache parameters;
   a buffer random access memory having a first portion allocated for the defect table and a second portion allocated for data caching, the defect table and the data cache parameters being uploaded into the buffer random access memory from the storage media; and
   a controller operably coupled to the storage media and to the buffer random access memory,
      the controller configured to implement the steps of:
      determining actual memory space of the first portion of the buffer random access memory occupied by the defect table to identify unused memory space of the first portion;
   reallocating the unused memory space of the first portion of the buffer random access memory for use in data caching; and
      swapping locations of the defect table and the unused memory space in the first portion of the buffer random access memory such that the unused memory space of the first portion of the buffer random access memory is closest to the second portion of the buffer random access memory reserved for data caching.

9. The mass storage device of claim 8, wherein the controller is configured to determine the actual memory space of the first portion of the buffer random access memory by implementing the steps of:
   obtaining information on a total number of defects identified on the storage media; and
   calculating the actual memory space of the first portion of the buffer random access memory occupied by the defect table based upon the total number of defects identified on the storage media.

10. The mass storage device of claim 8, wherein variables defined in the defect table are coded as address dynamic changeable.

11. The mass storage device of claim 10, wherein the controller is configured to implement the step of swapping locations of the defect table and the unused memory space in the first portion of the buffer random access memory by dynamically changing addresses of the variables defined in the defect table to obtain new defect table parameters.

12. The mass storage device of claim 11, wherein the controller is further configured to implement the step of saving the new defect table parameters and the data cache parameters on a storage media.

* * * * *